United States Patent [19]
Gray et al.

[11] Patent Number: 6,123,356
[45] Date of Patent: Sep. 26, 2000

[54] CONSTRUCTION AND METHOD OF MAKING AIR BAG CLOSURE ASSEMBLY

[75] Inventors: John D. Gray, Union, N.H.; C. Christopher Griggs, Oxford; David M. Smoger, Clarkston, both of Mich.

[73] Assignee: Textron Automotive Company, Dover, N.H.

[21] Appl. No.: 09/128,513

[22] Filed: Aug. 3, 1998

[51] Int. Cl.[7] .................................................. B60R 21/20
[52] U.S. Cl. ........................................ 280/728.3; 280/732
[58] Field of Search .................................. 280/728.3, 732

[56] References Cited

U.S. PATENT DOCUMENTS

| | | |
|---|---|---|
| 4,952,351 | 8/1990 | Parker et al. |
| 5,378,014 | 1/1995 | Cooper . |
| 5,498,027 | 3/1996 | Kelley et al. ........................ 280/728.3 |
| 5,673,931 | 10/1997 | Gray et al. .......................... 280/728.3 |
| 5,709,828 | 1/1998 | Bemis et al. .......................... 264/46.5 |
| 5,845,931 | 12/1998 | Nagy et al. ......................... 280/728.3 |
| 5,863,062 | 1/1999 | Harada et al. ....................... 280/728.3 |

*Primary Examiner*—Lanna Mai
*Assistant Examiner*—Ruth Ilan
*Attorney, Agent, or Firm*—Reising, Ethington, Barnes, Kisselle, Learman & McCulloch, PC

[57] ABSTRACT

An instrument panel of an automotive vehicle includes a rigid retainer preformed with an air bag opening and a recessed ledge extending about the opening. A separately formed door is installed on the opening and hinged to the retainer along one edge. The remaining three edges overlie the ledge to prevent inward movement of the door. The retainer and door are placed in a cavity of a mold tool in spaced relation to an outer skin and foam constituents are reacted therebetween to develop a foam layer. A foam seal is provided at the interface of the ledge and door to prevent the escape of foam past the ledge.

15 Claims, 2 Drawing Sheets

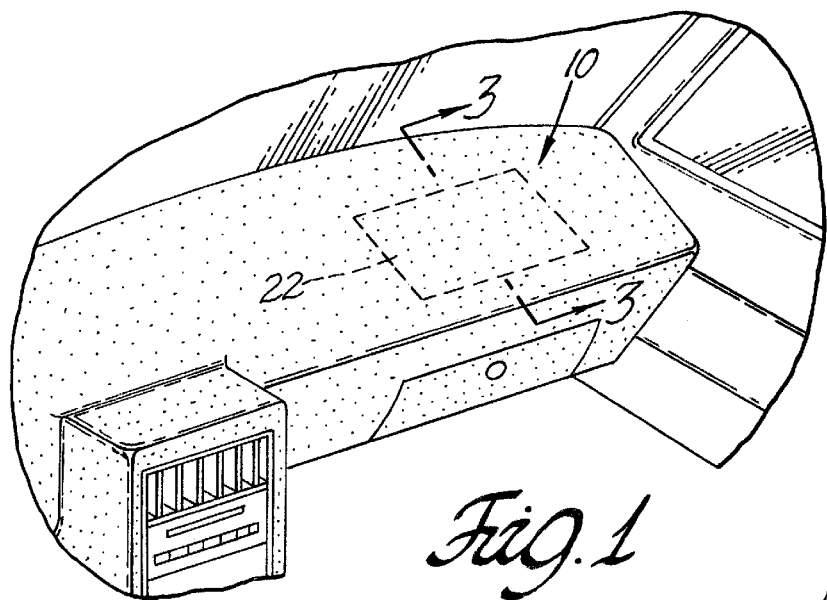
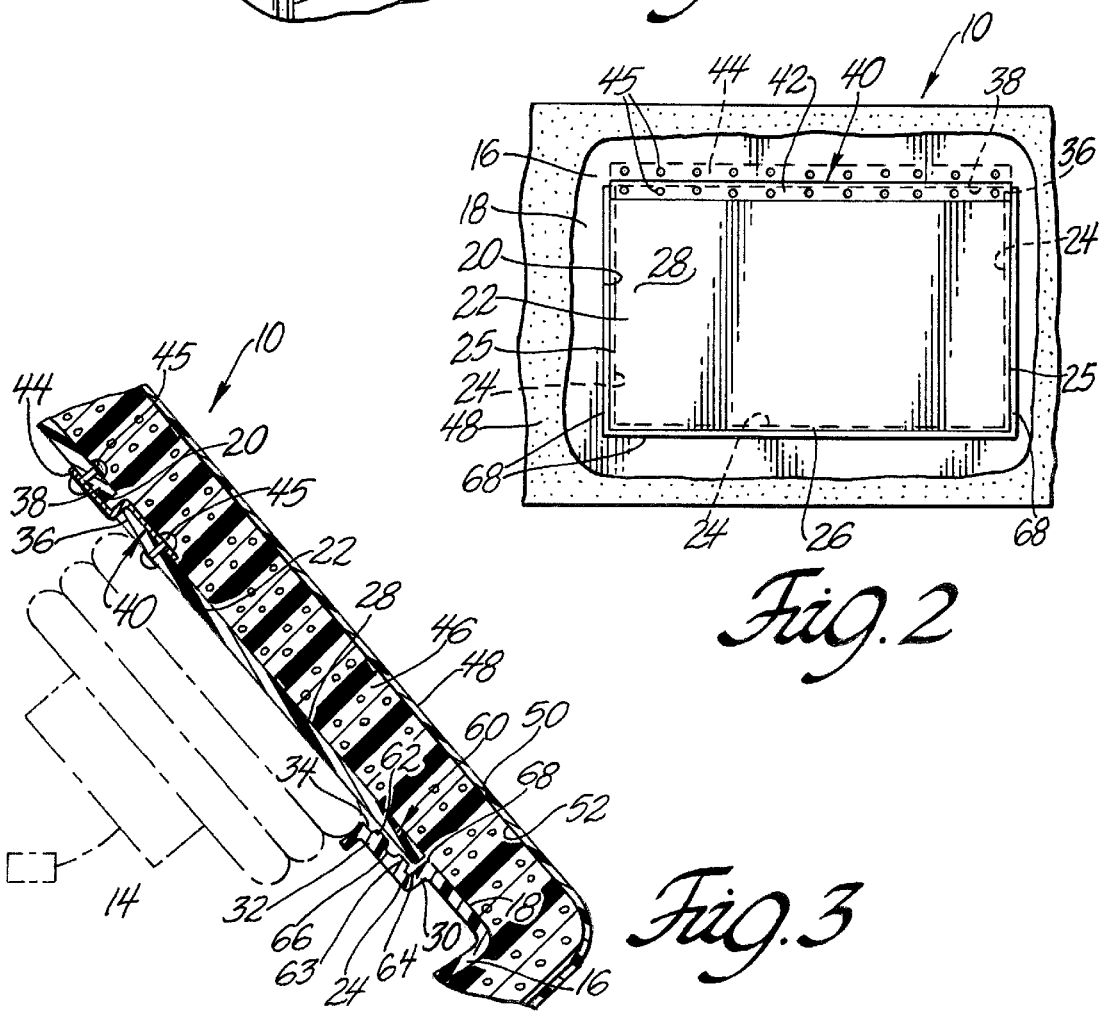

CONSTRUCTION AND METHOD OF MAKING AIR BAG CLOSURE ASSEMBLY

This invention relates generally to instrument panels for automotive vehicles of the type having a retainer panel formed with an airbag deployment opening and a separately formed deployment door installed in the opening and covered by a continuous foam and skin layer and, more particularly, to the means of controlling foam leakage past the door during manufacture of the instrument panel.

BACKGROUND OF THE INVENTION

In manufacturing instrument panels of the above type, the separately formed door is typically hinged along one edge to the retainer and a gap exists along the remaining edges to provide clearance for installation and opening. The overlying foam layer is foamed in place in the space provided between the outer skin layer and an upper surface of the door and retainer members.

According to known practice, the gap between the door and retainer is masked off with adhesive tape after the door has been installed in the opening. The tape is applied to the outer surfaces of the door and retainer members across the gap and serves to block the foam material from leaking past the door. Application of such tape, although effective, adds an extra step in the manufacturing process and further presents a barrier to the direct adhesion of the foam material to the door and retainer members in the region of the masked areas.

An air bag closure assembly according to a method and construction of the invention overcomes and greatly minimizes the foregoing objections.

SUMMARY OF THE INVENTION

An instrument panel closure assembly for an air bag system of a vehicle according to the invention comprises a rigid retainer member having a top surface and a preformed air bag deployment opening surrounded at least in part by a retainer ledge recessed below the top surface. At least one separately formed door member is accommodated in the deployment opening of the retainer member and supported by the recessed retainer ledge against movement inwardly of the retainer ledge. A continuous outer flexible polymeric skin layer is spaced in overlying relation to the retainer and door members, between which an intermediate layer of foam material is foamed in place. A foam blockage seal is provided at the interface between the door member and the recessed ledge of the retainer member and is operative to block the passage of foam layer material past the door member and ledge during the formation of the foam layer.

The foam blockage seal may be formed as an integral part of the ledge and/or door or may be formed separately and applied to the ledge before installation of the door. The recessed seal eliminates the need for surface-applied masking tape and in doing so promotes complete, uniform direct adhesion of the foam layer to the underlying door and retainer members.

These and other features and advantages of the invention will become readily apparent when considered in connection with the following detailed description and drawings.

THE DRAWINGS

Presently preferred embodiments of the invention are disclosed in the following description and in the accompanying drawings, wherein:

FIG. 1 is a fragmentary perspective view of an interior instrument panel trim component constructed according to the invention;

FIG. 2 is a fragmentary plan view of such trim component showing the outer skin and foam layer broken away to expose the underlying door and retainer members;

FIG. 3 is an enlarged cross-sectional view taken along lines 3—3 of FIG. 1;

DETAILED DESCRIPTION

Figure 4:
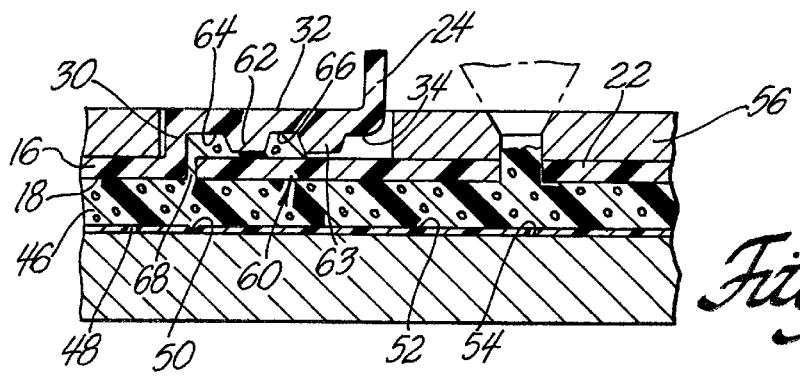
FIG. 4 is an enlarged cross-sectional view illustrating a preferred method of fabricating the trim component according to the invention.

Referred now to FIGS. 1–3, an interior instrument panel trim component assembly 10 is illustrated concealing an air bag assembly 14 of known type.

The assembly 10 includes a retainer member 16 constructed as a rigid plastic or metal panel having a top surface 18 and a preformed deployment opening 20 normally closed by a separately formed door member 22. While in the illustrative embodiment the assembly 10 has a single door member 22, it will be appreciated that the invention is applicable and contemplates multiple door arrangements, such as that disclosed in U.S. Pat. No. 5,451,075, which is commonly owned by the assignee of the present invention and its disclosure incorporated herein by reference.

The opening 20 of the retainer 16 is generally rectangular and framed on three sides thereof by an integral ledge 24 recessed below the top surface 18 of the retainer 16. As illustrated best in FIG. 3, the ledge 24 has a generally L-shaped cross section including a downwardly depending side wall 30 and a transverse support wall 32 having an upper surface 34 generally parallel to but spaced from the top surface 18 of the retainer member 16.

The ledge 24 underlies corresponding side 25 and rear 26 edge regions of the door 22 (with respect to their relative positions in relation to the front and rear of the vehicle) supporting the door 22 against movement inwardly of the retainer and a top surface 28 of the door 22 aligned preferably flush with the top surface 18 of the retainer 16. Alternatively, the top surface 28 of the door 22 may be raised above the top surface 18 of the retainer 16, or the top surface 28 of the door 22 may be subflush with the top surface 18 of the retainer 16.

A forward edge 36 of the door 22 is secured to an adjacent forward edge 38 of the retainer 16 by a separate hinge 40 having a generally S-shaped strap configuration with one leg 42 overlying the forward edge 36 of the door and the other leg 44 extending beneath the forward edge 38 of the retainer and secured to each by a plurality of spaced rivets 45, or the like.

The retainer and door members 16, 22 are covered by a cushioning foam layer 46 and an outer flexible, decorative shell or skin layer 48. The skin layer 48 is preferably formed of a thermoplastic polymer, such as polyvinyl chloride, thermoplastic urethane, or thermoplastic olefin, according to known manufacturing techniques but could also be a thermoset polymer such as thermoset urethane. The skin 48 has a weakened invisible seam 50 formed therein corresponding in location and shape to the unhinged marginal edges 26 of the door member 22 according to known techniques. The foam layer 46 is fabricated by known foam-in-place techniques and foam reactant materials, such as urethane foam, in the space 52 between the skin layer 48 and the top surfaces 18, 28 of the retainer and door members 16, 22.

FIG. 4 schematically illustrates the general technique for molding the foam layer 46. As shown, the preformed skin layer 48 is positioned topside down in a cavity 54 of a mold tool 56 shaped in accordance with the desired shape of the instrument panel 12. The assembled retainer and door members 16, 22 are inserted into the mold and supported in spaced relation to the outer skin 48 to provide the foam space 52. Suitable foam reactants are then introduced into the space 52 where they react, expand and cure to fill the space 52 and generate the foam layer.

According to the invention, a seal 60 is provided between the ledge 24 of the retainer member 16 and the confronting edges 26 of the door 22 to prevent the foam 46 from escaping or leaking past the door 22 and ledge 24. The seal is formed between the door member 22 and the ledge 24 upon installing the door 22 in the opening 20. The invention contemplates various seal arrangements between the ledge 24 and door 22, the first of which is illustrated in FIGS. 3 and 4, with additional embodiments shown in FIGS. 5–8.

Turning now specifically to FIGS. 3 and 4, the support wall 32 of the ledge 24 is shown formed with at least one and preferably a pair of raised inner 62 and outer 63 ribs that project above the upper surface 34 of the support wall 32. The ribs 62, 63 are spaced inwardly of the side wall 30 and spaced laterally with respect to one another to define open channels 64, 66 underlying the door 22 adjacent the side wall 30 and between the ribs 62, 63 respectively. The ribs 62, 63 run continuously along the ledge 24 and preferably are in contact or close proximity with the underside of the door member 22 along the unhinged sides of the door 22, such that the ribs 62, 63 together with the hinge 40 seal the space 52 against foam leakage beyond the ledge 24. The expanding foam 46 enters a peripheral clearance gap 68 between the side wall 30 of the ledge 24 and the edge of the door 22 and from there pass into the first channel 64 beneath the door 22. The channel 64 serves as a reservoir for the foam 46 and in some cases may completely contain the excess foam. The invention contemplates that small gaps or spaces may exist between the top of the ribs 62, 63 and the confronting surface of the door 22 due to imperfections, pressure buildup, or designed clearance, allowing some of the foam material 46 to pass from the outer channel 64 into the adjacent inner channel 66. In this way, the ribs 62, 63 cooperate with the door 22 to define a tortuous, constricted flow path (i.e. a labyrinth seal) for the foam as it passes between the door 22 and ledge 24, causing the foam to accumulate and be retained in one or both channels 64, 66. As foam flows through thin cross-sections as at gap 68 and small gaps between ribs 62, 63 and door 22, its viscosity tends to increase and limit foam leakage at the door/retainer interface defined at gap 68.

It is preferred that the ribs 62, 63 be formed integrally with the formation of the ledge 24, and as such they may be molded, stamped or cast as unitary projections rising above the top surface 28 of the ledge 24 to meet the underside marginal regions 26 of the door 22.

Figure 5:
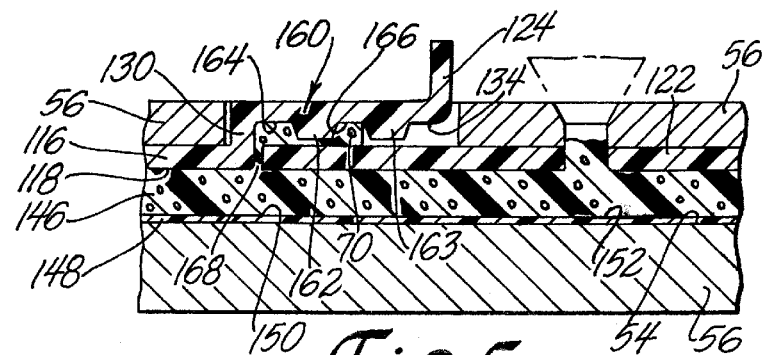
FIGS. 5–8 are each enlarged fragmentary cross-sectional views illustrating alternative sealing arrangements of the invention.

FIG. 5 illustrates an alternative embodiment of the foam blockage seal, in which like reference numerals are used to identify like parts, but are offset by one hundred. The construction of the foam seal 160 is the same as that of the first embodiment of FIGS. 3 and 4, except that an additional resilient strip or gasket 70 is provided in the channel 166 to block the passage of the foam material 146 beyond the gasket 70. The gasket 70 is formed of a resilient, compressible material such as rubber, elastomeric plastic, and synthetic foam. However, it should be understood that any natural or synthetic gasket material will suffice, depending upon a particular application.

In the preferred embodiment, the foam strip or gasket 70 extends continuously along the ledge 24 around all three unhinged sides of the door member 22, and further is adhered at least to the ledge and preferably to the door 22 as well by means of an adhesive carried on the facing top and bottom surfaces 72, 74 of the gasket 70.

The foam gasket 70 is strong enough to hold the door 22 and ledge 24 sealed, yet is separable upon deployment of the air bag 14 to allow the door member 22 to swing outwardly of the retainer member 16 during such deployment. According to a preferred construction, the adherence strength of the foam strip 70 exceeds its tear strength, such that the foam layer 70 is caused to tear in half upon deployment of the air bag 14 with one half of the foam strip 70 remaining adhered to the ledge 24 and the other separated half remaining adhered to and carried outwardly with the door member 22.

Figure 6:
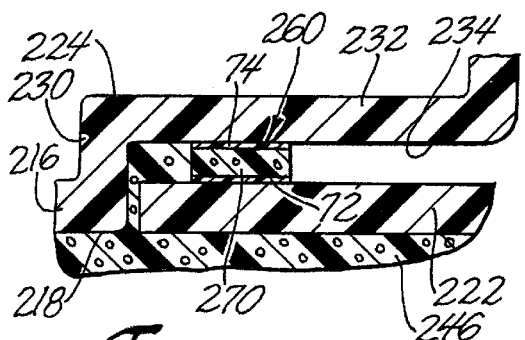

FIG. 6 illustrates another embodiment of the invention, wherein like features are referenced by like numerals, but offset by two hundred. The foam seal 260 of the FIG. 6 embodiment is identical to that described above with respect to FIG. 5 except that the FIG. 6 embodiment lacks the rib formations 62, 63 and has only the foam strip 270 adhered to the door 22 and ledge 24 members.

Figure 7:
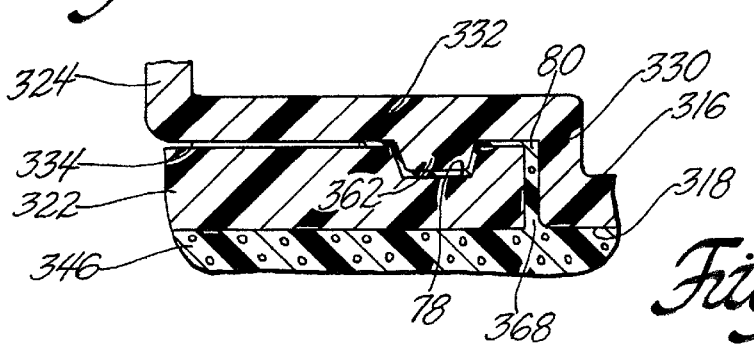

FIG. 7 illustrates a still further embodiment of the invention with like features referenced by like numerals offset by three hundred. The ledge 324 is molded with a rib 362 as described previously. The door 22 is molded with a corresponding channel or recess 78 aligned to nest with the rib 362 of the retainer member. As shown in FIG. 7, the interleaving rib 362 and channel 78 may be located inwardly from the edge of the door 322 and side wall 330 of the ledge 324 to provide a reservoir 80 for the foam material 346 functioning as a labyrinth seal like that of the channel 64 described previously with respect to the first embodiment of FIGS. 1–4.

Figure 8:
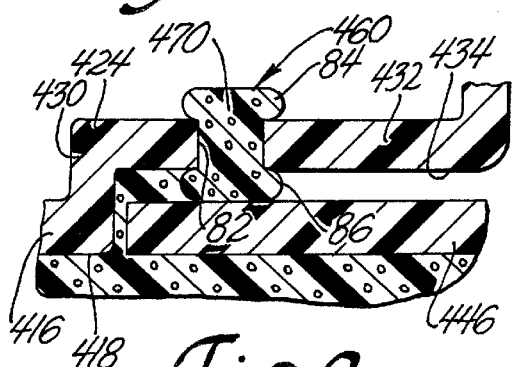

FIG. 8 shows yet another embodiment of the foam blockage seal 460 wherein the support wall 432 of the ledge 424 is formed with a mounting channel 82 in which a resilient foam or rubber gasket 470 is installed to provide a seal between the ledge 424 and door 422. The gasket 470 in this embodiment has enlarged end regions or heads 84, 86 that reside above and below the channel 82 when the gasket 470 is installed therein. In this way, the gasket 470 can be installed with a snap-fit connection into the channel 82 for ease of assembly.

If desired, the rib and seal configurations of the prior embodiments can be formed on the door rather than the ledge to serve the same function.

Furthermore, while it is preferred that the ribs, seals and gaps therebetween be formed continuously around the sides and rear of a door, the invention also encompasses an arrangement wherein such seal structure is provided over at least part of such sides and rear.

The disclosed embodiments are representative of a presently preferred forms of the invention, but are intended to be illustrative rather than definitive thereof. The invention is defined in the claims.

We claim:

1. An automotive interior trim product construction comprising:

a rigid retainer member having an air bag deployment opening and a recessed ledge bordering said opening and spaced below a top surface of said retainer member;

a door member mounted within said opening of said retainer in a normally closed position in overlying relation to said ledge for concealing an air bag therebeneath, said door member being spaced laterally from said retainer member by a peripherally extending gap;

an outer skin layer overlying and spaced from said retainer and door members;

an intermediate foam layer of foamed-in-place material being interposed between said skin layer and said retainer and door members;

a seal provided at the interface between said door member and said recessed ledge of said retainer member operatively positioned to block the passage of said foam layer material beyond said ledge during foamed-in-place development of said foam layer;

wherein said seal comprises a labyrinth seal defining a constricted tortuous flow path for said foam material between said door member and said ledge; and wherein said labyrinth seal comprises at least one element that is secured from independent lateral movement free from a separate fastener member.

2. The construction of claim 1 wherein said seal includes at least one foam-collection channel.

3. The construction of claim 2 wherein said seal includes at least one standing rib extending along at least one of said ledge and said door member extending to said foam collection channel.

4. The construction of claim 3 wherein said seal includes at least two of said standing ribs spaced laterally from one another to define a channel therebetween.

5. The construction of claim 4 wherein said seal includes a resilient strip accommodated within said channel in foam-tight sealed engagement with said ledge and said door member.

6. An automotive interior trim product construction comprising:

a rigid retainer member having an air bag deployment opening and a recessed ledge bordering said opening and spaced below a top surface of said retainer member;

a door member mounted within said opening of said retainer in a normally closed position in overlying relation to said ledge for concealing an air bag therebeneath, said door member being spaced laterally from said retainer member by a peripherally extending gap;

an outer skin layer overlying and spaced from said retainer and door members;

an intermediate foam layer of foamed-in-place material being interposed between said skin layer and said retainer and door members;

a seal provided at the interface between said door member and said recessed ledge of said retainer member operatively positioned to block the passage of said foam layer material beyond said ledge during said foam-in-place development of said foam layer;

wherein said seal includes at least two standing ribs spaced laterally from one another to define a channel therebetween;

wherein said seal includes a resilient strip accommodated within said channel in foam-tight sealed engagement with said ledge and said door member; and wherein said resilient strip is adhered to said ledge and said door member.

7. The construction of claim 6 wherein said resilient strip is separable upon deployment of the air bag to accommodate outward opening movement of said door member.

8. The construction of claim 7 wherein said resilient strip is tearable upon said deployment such that a portion of said strip remains adhered to said ledge and the remaining portion remains adhered to said door member and is moveable outwardly therewith.

9. The construction of claim 1 wherein said seal includes a resilient strip confronting said door member and said ledge to provide a leak proof seal therebetween.

10. The construction of claim 9 wherein said resilient strip comprises a foam strip adhered to said door and ledge members.

11. The construction of claim 10 wherein said foam strip is separable upon deployment of the air bag and corresponding outward opening movement of said door member.

12. The construction of claim 11 wherein said foam strip is tearable upon said deployment of the air bag such that one portion of said strip remains adhered to said ledge and the remaining portion remains adhered to said door member and moves outwardly therewith.

13. The construction of claim 1 wherein said seal comprises a resilient strip secured to at least one of said ledge and said door member.

14. The construction of claim 1 wherein said door member is hinged along one side margin thereof to said retainer member and said gap and said seal extends at least partially along other side margins of said door member.

15. The construction of claim 14 wherein said door member has a top surface supported generally flush with said top surface of said retainer member when said door member is accommodated within said deployment opening.

* * * * *